(12) United States Patent
Wuerth et al.

(10) Patent No.: US 6,648,427 B1
(45) Date of Patent: Nov. 18, 2003

(54) METHOD AND DEVICE FOR CONTROLLING A BRAKE SYSTEM

(75) Inventors: Gebhard Wuerth, Sulzbach-Laufen (DE); Christian Zimmermann, Stuttgart (DE); Ulrich Gottwick, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/364,362

(22) Filed: Jul. 30, 1999

(30) Foreign Application Priority Data

Jul. 31, 1998 (DE) .......................... 198 34 661

(51) Int. Cl.7 ............................... B60T 8/60
(52) U.S. Cl. .............. 303/155; 303/3; 303/20; 303/113.4
(58) Field of Search ............... 303/155, 3, 15, 303/113.4, 166, 174, 177, DIG. 3, DIG. 4, DIG. 10, DIG. 11

(56) References Cited

U.S. PATENT DOCUMENTS 5,230,549 A * 7/1993 Osada et al. .................. 303/3
5,421,643 A * 6/1995 Kircher et al. ............... 303/3 X
5,496,097 A * 3/1996 Eckert ......................... 303/155
6,022,084 A * 2/2000 Horn et al. .................. 303/3 X
6,139,119 A * 10/2000 Otomo ............ 303/DIG. 11 X

FOREIGN PATENT DOCUMENTS

DE 195 10 522 9/1996

OTHER PUBLICATIONS

SAE Paper 96 0991, Electrohydraulic Brake System—The First Approach to Brake–By–Wire Technology by Wolf–Dieter Jonner, Hermann Winner, Ludwig Dreilich and Eberhardt Schunck.

* cited by examiner

Primary Examiner—Jack Lavinder
Assistant Examiner—Melanie Torres
(74) Attorney, Agent, or Firm—Kenyon & Kenyon

(57) ABSTRACT

A method and a device for controlling a brake system, where a braking intention value, which is used for controlling the brake system, is determined from at least one brake pedal actuation parameter. When the braking intention value is determined from the actuation parameter, its direction of change is taken into account.

6 Claims, 3 Drawing Sheets

METHOD AND DEVICE FOR CONTROLLING A BRAKE SYSTEM

BACKGROUND INFORMATION

SAE Paper 96 0991, Electrohydraulic Brake System—The First Approach to Brake-By-Wire Technology by Wolf-Dieter Jonner, Hermann Winner, Ludwig Dreilich and Eberhardt Schunck, describes a method and a device for controlling a brake system, in which a driver's intention is determined on the basis of the magnitude of at least one measured signal and implemented by actuating actuator elements at the wheel brakes. This document proposes that the pedal travel and the main cylinder pressure be determined at the brake pedal and the driver's intention be determined on the basis of this information. In the example described, the driver's intention is interpreted as a desired deceleration, which is implemented by suitable actuation of the brakes via electrohydraulic valve arrangements.

In order to determine the driver's intention and the desired values for controlling the wheel brakes from a parameter or a combination of parameters representing a brake pedal actuation, characteristic curves are customarily used. An example thereof is described in German Patent Application No. 195 10 522, where the pedal force and the pedal travel are used as actuation parameters, the braking intention is determined from a combination of these parameters, and desired values for the wheel brakes are determined from the braking intention, taking into account wheel- and axle-specific functions.

It has been found that pure conversion of the actuation parameters, i.e., measured values of the pedal travel, pedal force and/or main cylinder pressure, into a driver's braking intention results in an unusual response when the driver's actions are changed. The brakes should, however, be actuated based on the driver's actions so that the driver can set the desired deceleration in a simple manner with a graduated brake response without first having to learn the behavior of the brake system.

Therefore, an object of the present invention is to improve driver-friendliness and drivability by suitable control of an electrically controlled brake system.

SUMMARY OF THE INVENTION

Driver-friendliness and drivability of a vehicle equipped with an electrically controlled brake system is considerably improved because the usual and known behavior of conventional brake systems is emulated by taking into account hysteresis elements in forming the driver's braking intention as described in the following. This increases the acceptance of an electronically controlled brake system. At the same time, the graduated response of the brake system is improved, which makes it possible to achieve optimum adaptation of the average capability of a driver to control the brake system, which is not possible with a conventional brake system, because the hysteresis characteristics, which are manifested in conventional brake systems due to the mechanical behavior of the elements, can be modified in magnitude and/or form in any desired manner, so that the hysteresis characteristics can be adapted to the desired behavior of the brake system.

It is particularly advantageous that hysteresis is used in converting at least one actuation signal into a driver's intention signal (desired deceleration, desired braking force, etc.).

DETAILED DESCRIPTION

Figure 1:
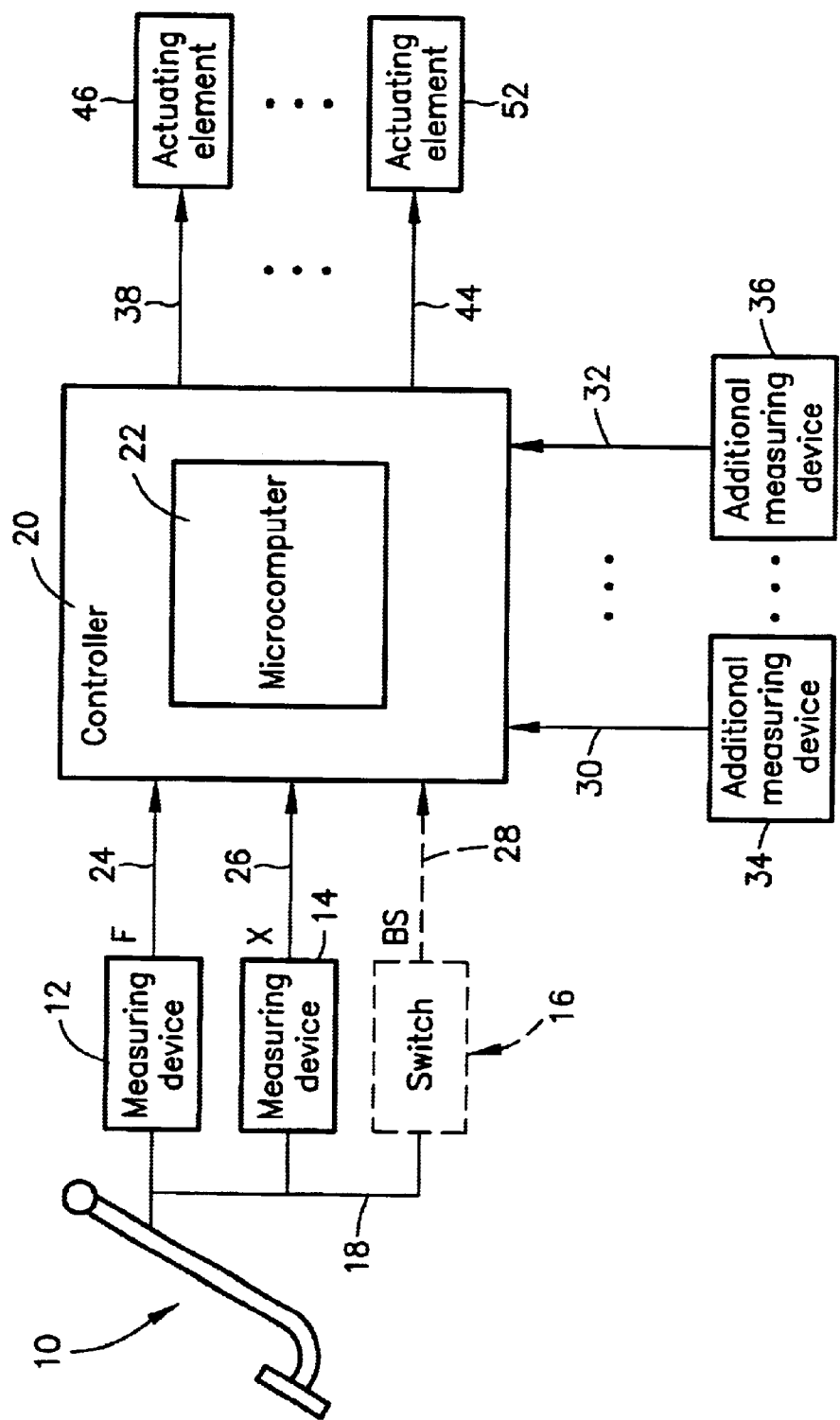
FIG. 1 shows the arrangement of an electrically controlled brake system.

FIG. 1 shows an electronic control system for a vehicle brake system. An operating element that is actuatable by the driver, preferably a brake pedal 10, is connected to a measuring device 12 for detecting the actuating force F, a measuring device 14 for detecting the traveled path or angle X, and to the binary detection of the brake pedal actuation or brake light status BS, optionally via a switch 16. Furthermore, in addition or as an alternative to the aforementioned parameters, the main cylinder pressure P is determined in an electrically controlled hydraulic brake system.

The linkage between brake pedal 10 and measuring devices 12, 14, and 16 is represented in FIG. 1 by a mechanical connection 18. Furthermore, a controller 20, which has at least one microcomputer 22, is illustrated. Input line 24 from measurement device 12, input line 26 from measurement device 14 and optional input line 28 from switch 16 are connected to this controller 20 and microcomputer 22. Furthermore, input lines 30 through 32 from additional measuring devices 34 through 36, which detect selected operating parameters of the brake system, the vehicle or its propulsion system, are connected to controller 20 and microcomputer 22. Controller 20 and microcomputer 22 are connected, via output lines 38 through 44, to actuating elements 46 through 52, which operate the wheel brakes. The actuator elements in the preferred embodiment are valve arrangements, which control the pneumatic or hydraulic pressure in the wheel brake cylinders. Each valve arrangement may be assigned to one wheel brake or to the wheel brakes of one axle. In the preferred embodiment, controller 20 actuates the wheel brakes in a pressure control circuit, whose desired value is defined by the braking intention SOLL for each individual wheel. In an advantageous embodiment, actuators 46 through 52 are electric motors, which actuate the individual brakes.

Controller 20 and microcomputer 22 detect, via the input lines, actuating force F, pedal travel X and/or main cylinder pressure P, as well as, in an advantageous embodiment, brake light status BS. These signals are analyzed at least to determine the braking intention and thus the desired value for controlling the brake system. The braking intention determined on the basis of one of the aforementioned parameters or a combination thereof is converted into desired values for the individual wheel brakes, taking into account other operating parameters such as brake pad wear, axle load, etc., according to predefined characteristic curves or maps. These desired values represent, depending on the brake system, the braking pressure to be set, the braking moment to be set, the braking force to be set, or the vehicle deceleration. These parameters are then set in one or more control circuits on the wheel brakes.

In one embodiment, braking intention values (desired decelerations) are determined from the pedal travel and, main cylinder pressure parameters via characteristic curves; the braking intention values are converted, by further conversions using the characteristics of the brake, into brake pressures for the front and rear wheels. In a preferred embodiment, the braking intention is formed by combining and weighting contributions from different sensors that detect the actuation of the brake pedal. Braking intention values are determined from each individual actuation signal and optionally from its variation over time using characteristic curves; the braking intention is obtained by weighting and combining these values. It is then converted into wheel brake pressure values, wheel braking forces or wheel braking moments, which are set via actuators. The method described in the following is applied to all these characteristic curves, from which a contribution to the braking intention is determined as a function of an actuation parameter.

The formation of the braking intention on the basis of a characteristic curve is described in the following, where an actuation parameter, which can be formed from any desired combination of the above-mentioned sensor signals or their derivatives with respect to time and which represents the driver's action, is plotted against the value of the braking intention parameter or of the braking intention contribution parameter.

The sensors used have a hysteresis characteristic of their own depending on their measuring principle. If these sensor values are, recalculated into braking intention values (e.g., 50 mm pedal travel at 12 bar main cylinder pressure result in braking pressures corresponding to 0.5 g deceleration), a brake response results, to which the driver becomes accustomed after a practice period, but which is still different from what the driver perceives as optimum. According to the present invention, determination of the driver's intention depends on the relevant sensor parameter or a combination of sensor parameters and/or their variation over time (actuation parameter) and on whether this actuation parameter is increasing or decreasing.

Figure 2A:
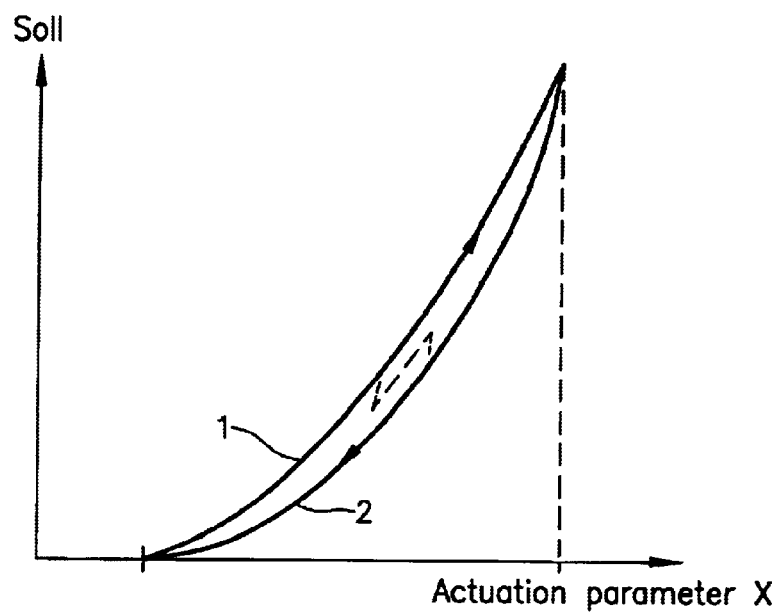
FIG. 2a shows the formation of the driver's intention in a preferred embodiment in a first diagram.

This is illustrated in FIG. 2a. If the parameter is increasing, the braking intention is computed according to curve 1; if the parameter is decreasing, the braking intention is computed according to curve 2. Depending on the parameter, curve 2 may be located under or over curve 1.

If the driver diminishes the action (actuation parameter), even before reaching the maximum value, the transition between the two characteristic curves is described by a transition function, which is illustrated in FIG. 2a with a dashed line. For example, if the driver diminishes his action while the actuation signal increases, the braking intention is initially formed according to the dashed decreasing curve. If the driver again increases his action prior to reaching curve 2, the braking intention is determined using the dashed rising curve. If then the driver withdraws his action again, it is reduced according to the dashed line, in the example illustrated, to curve 2.

Figure 2B:
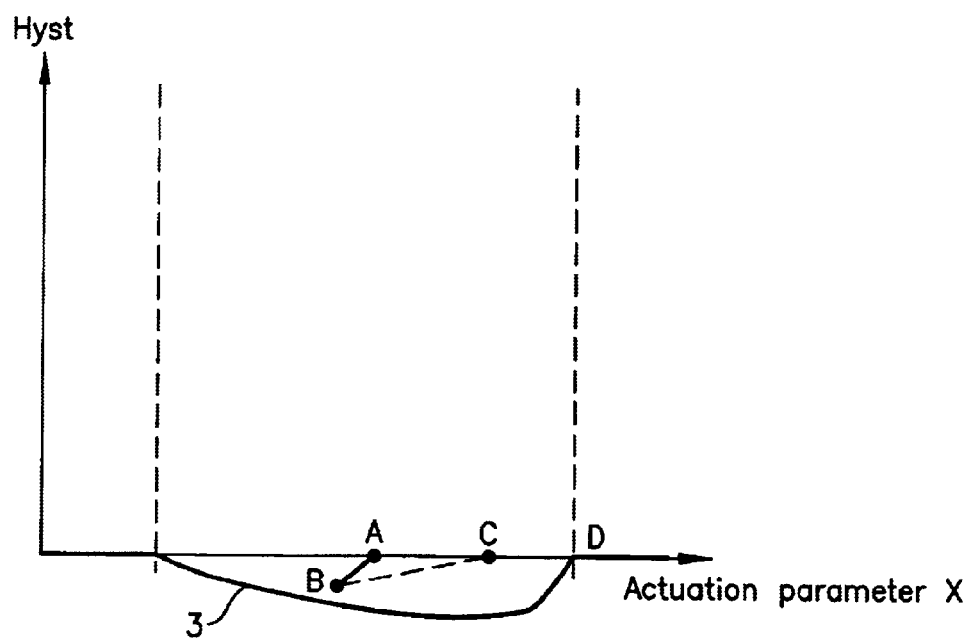
FIG. 2b shows the formation of the driver's intention in a preferred embodiment in a second diagram.

This example is further elucidated with reference to FIG. 2b, where the hysteresis value HYST, i.e., the difference between the two characteristic curves, is plotted against the actuation parameter. Curve 1, the rising branch of the curve, is used as the base parameter, so that curve 3 represents the distance of curve 2 from curve 1 plotted against the actuation parameter.

The driver increases the actuation parameter up to point A. The braking intention is formed on the basis of curve 1. In point A he somewhat diminishes his action. Hysteresis contribution HYST then increases with a constant slope with point A as reference point as a function of the actuation parameter, usually up to the maximum hysteresis value, i.e., until curve 3 or, with reference to FIG. 2b, curve 2 is reached. In the example described, however, the driver increases his action up to point B, so that curve 3 is not attained. As a result, the hysteresis contribution further decreases with a constant slope depending on the actuation parameter, with the slope being selected so that curve 1 is attained (point C) approximately midway between the start of the actuation reversal (point B) and the maximum value (point D). Curves 1 and 2 are therefore always the limits within which the value of the braking intention parameter is located. The exact variation, the magnitude and/or shape of the hysteresis can be applied according to the customer's wishes for each type of vehicle.

In other embodiments, instead of straight lines with predefined slopes, other monotone functions are used.

Figure 3:
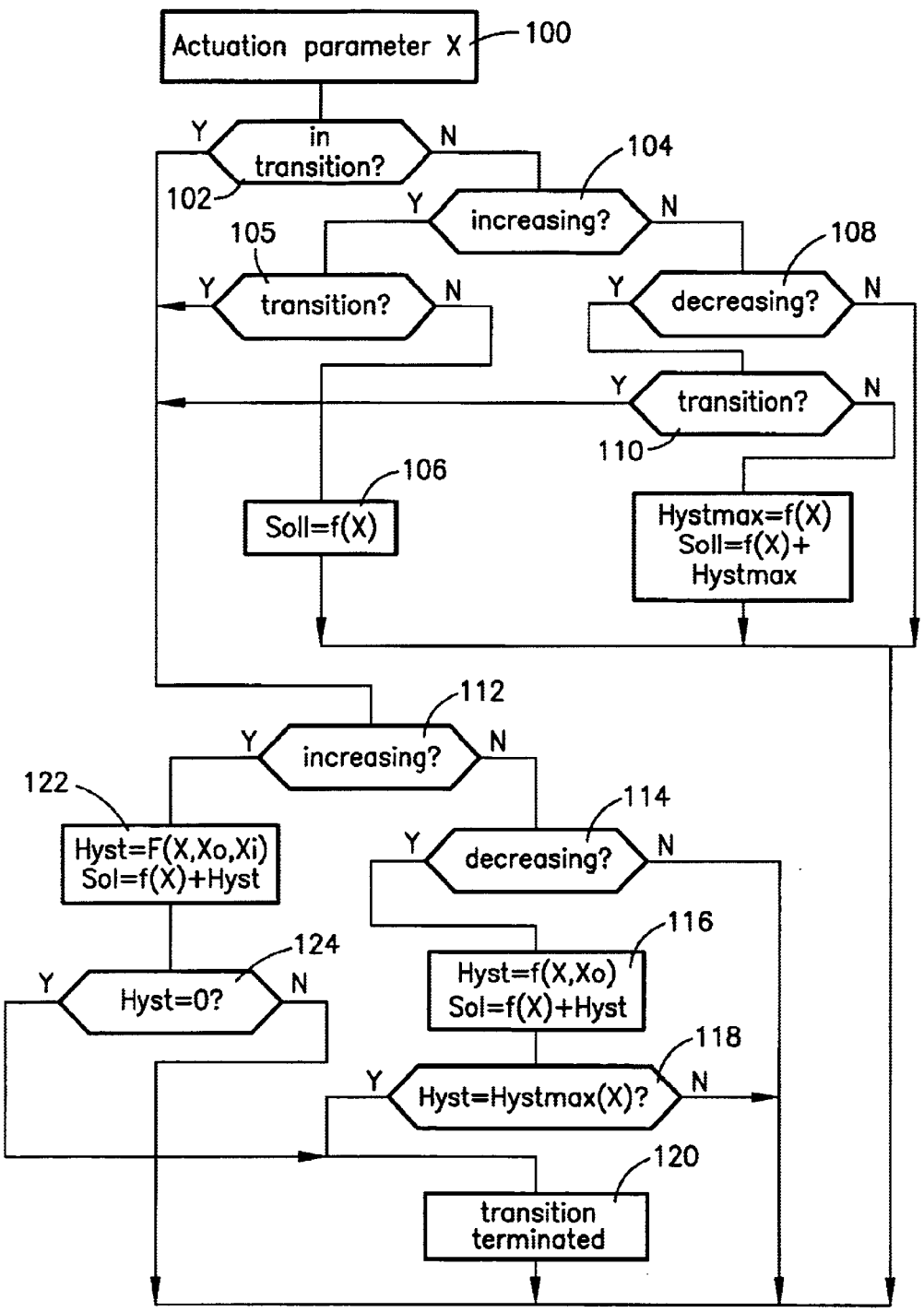
FIG. 3 schematically shows the implementation of the method according to the present invention as a computer program, using a flow chart.

The above-described method is implemented in the framework of a computer program, which is schematically shown as a flow chart in FIG. 3 with reference to a preferred embodiment.

The program described is executed at predefined points in time, for example, every few milliseconds during a braking sequence as the brake pedal is actuated. In first step 100, actuation parameter X, which corresponds to one of the above-described sensor parameters or a combination of these sensor parameters, optionally taking into account the variation of these sensor parameters over time, is entered. In the subsequent step 102, it is checked, for example, using a flag, whether the system is in a transition state, i.e., whether a switch between characteristic curve branches is taking place. If this is not the case, it is determined in step 104 whether the actuation parameter X is increasing, i.e., changing to higher values. This means that the driver's braking action is increasing. The query in step 104 is performed using a comparison of the instantaneous measured actuation parameter with at least one previous actuation parameter (as is done in the opposite direction). Then in step 105 it is checked using flags whether a change in the direction of movement has just taken place. If this is the case, the procedure continues with step 112; otherwise it continues with step 106. If it is assumed in this example that no transition state exists, the braking intention SOLL is determined according to step 106 as a function of actuation parameter X following the rising branch of the characteristic curve. Then the program is terminated and repeated at the next time interval.

If the driver then diminishes the action, it is recognized in step 104 that the actuation parameter is no longer increasing. In subsequent step 108 it is checked whether the actuation parameter is decreasing. If this is the case, it is checked in step 110 whether a transition state is present. This is the case if after a rising actuation parameter a decreasing actuation parameter is detected and confirmed via a flag. In this case it is checked in step 112 for the transition state whether the actuation parameter is increasing (step 112). If it is not increasing, it is checked if it is decreasing (step 114). If this is the case (see example of FIGS. 2a and 2b), the hysteresis contribution HYST is formed in step 116 as a function of the instantaneous actuation parameter and reference point X0 of the actuation parameter at which the reversal of the driver's action took place. On the basis of the reference point and a predefined slope, a straight line is formed, which represents the contribution of the hysteresis as a function of the actuation parameter (see FIG. 2b). Braking intention SOLL is then formed on the basis of the actuation parameter according to the reference characteristic curve (here the characteristic curve of the rising branch) and a hysteresis contribution HYST. In subsequent step 118 it is checked whether the hysteresis contribution has attained the maximum contribution HYSTMAX predefined for the present value of the actuation parameter. If this is the case, the transition state is terminated according to step 120; otherwise the program is terminated.

If the driver again changes the direction of his action prior to attaining the maximum hysteresis contribution, an increasing actuation parameter is detected in step 112 after step 102; in step 122 the braking intention parameter SOLL is determined on the basis of the reference characteristic curve as a function of actuation parameter X and of a hysteresis contribution HYST. The hysteresis contribution is determined via a linear equation with a predefined slope, formed on the basis of reversal point X0 of the actuation parameter and expected point of intersection X1 with the characteristic curve. Then in step 124 it is checked whether the calculated hysteresis contribution has zero value. This is the case if the transition phase is completed and the braking intention parameter has approached a value on characteristic curve 1, which is the rising characteristic curve. If this is the case, in step 120 the transition state is assumed as terminated, and the program is terminated. This applies also in the case of a No answer in step 124.

If both step 104 and step 108, as well as steps 112 and 114 result in No responses, the program is terminated without forming a new braking intention.

The preferred field of application of this method is an electrohydraulic brake system.

What is claimed is:

1. A method for controlling a brake system, comprising the steps of:
   determining at least one actuation parameter representing an actuation of a brake pedal, the at least one actuation parameter having a direction of change;
   determining a braking intention of a driver as a function of the at least one actuation parameter and the direction of change of the at least one actuation parameter;
   controlling electrically actuated actuating elements of wheel brakes as a function of the braking intention of the driver;
   wherein the braking intention is determined as a further function of a hysteresis contribution; and
   further comprising the step of changing the hysteresis contribution with a reversal of the direction of change of the at least one actuation parameter according to a monotone function, the monotone function being a straight line with a predefined slope.

2. The method according to claim 1, wherein the at least one actuation parameter includes at least one of:
   (a) a brake pedal force;
   (b) a brake pedal travel;
   (c) a pressure in a main cylinder;
   (d) a variation over time of at least one of (a), (b) and (c); and
   (e) a combination of (a), (b) and (c).

3. The method according to claim 1, wherein the braking intention is determined using a characteristic curve having a hysteresis.

4. The method according to claim 1, wherein the at least one actuation parameter is determined from a weighted combination of brake pedal actuation signals.

5. The method according to claim 1, wherein the at least one actuation parameter includes a plurality of actuation parameters, and wherein values linked to the braking intention are determined as a function of the plurality of actuation parameters.

6. A method for controlling a brake system, comprising the steps of:
   determining at least one actuation parameter representing an actuation of a brake pedal, the at least one actuation parameter having a direction of change;
   determining a braking intention of a driver as a function of the at least one actuation parameter and the direction of change of the at least one actuation parameter; and
   controlling electrically actuated actuating elements of wheel brakes as a function of the braking intention of the driver, wherein the at least one actuation parameter is determined from a weighted combination of brake pedal actuation signals.

* * * * *